March 18, 1924.
P. T. REGAN
1,487,266
TRAILER BRAKE
Filed Oct. 25, 1921
2 Sheets-Sheet 1
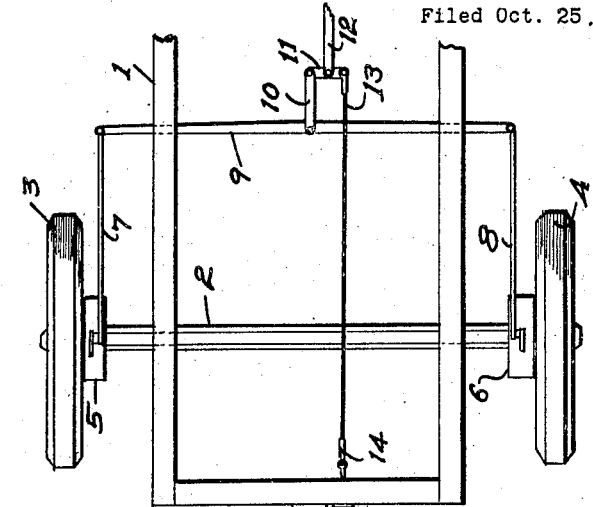
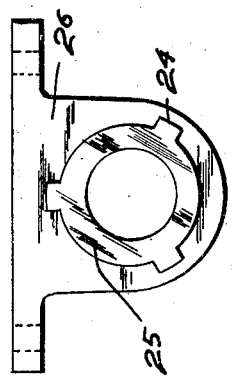
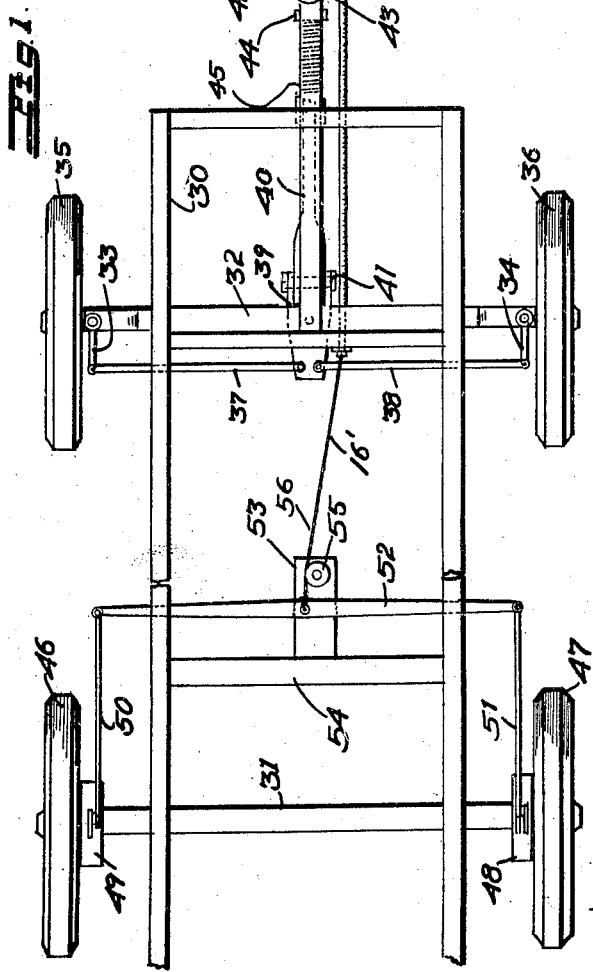
INVENTOR.
Paul T. Regan
BY
Carlos P. Griffin
ATTORNEY.

March 18, 1924. 1,487,266
P. T. REGAN
TRAILER BRAKE
Filed Oct. 25, 1921 2 Sheets-Sheet 2
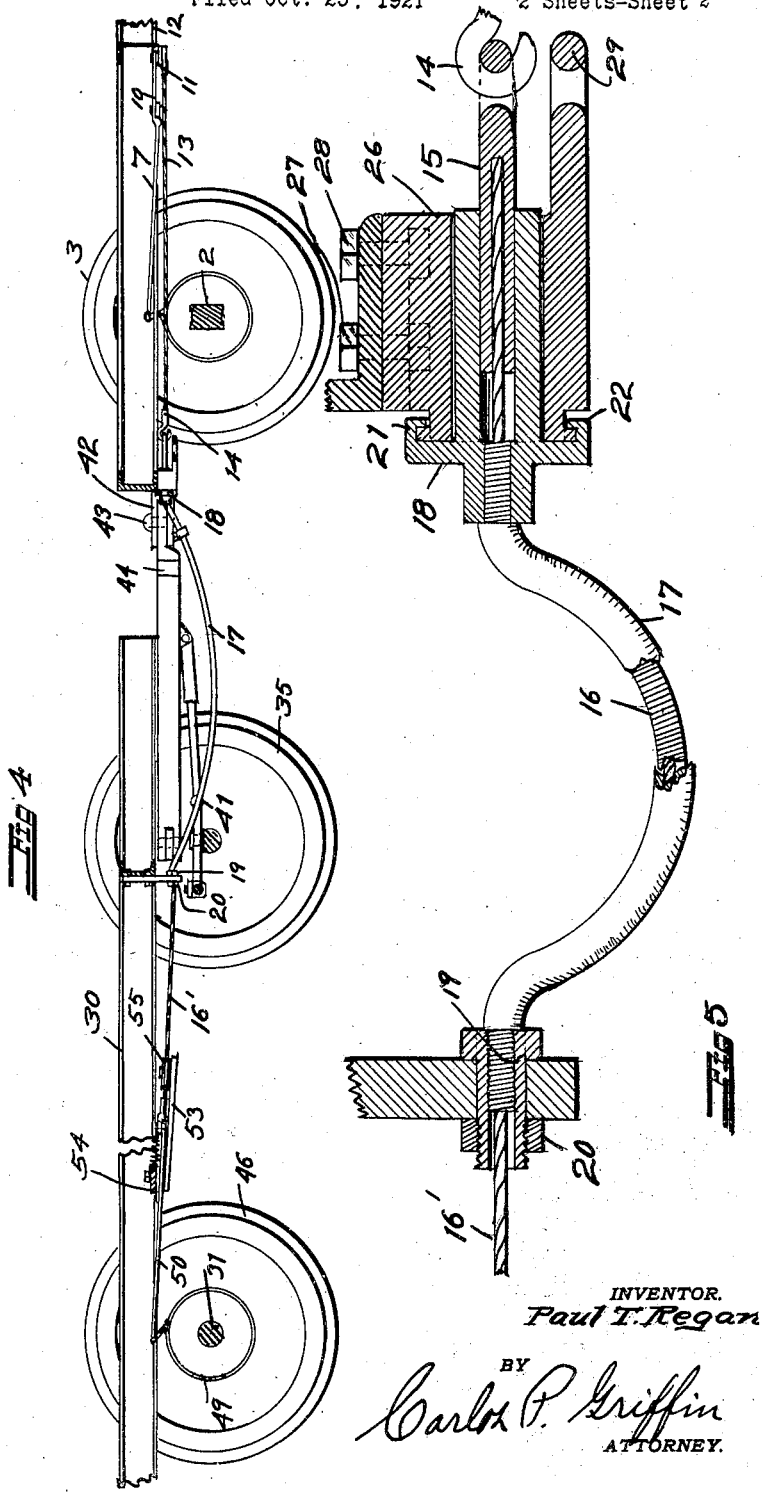
INVENTOR.
Paul T. Regan
BY
Carlos P. Griffin
ATTORNEY.

Patented Mar. 18, 1924.

1,487,266

UNITED STATES PATENT OFFICE.

PAUL T. REGAN, OF OAKLAND, CALIFORNIA, ASSIGNOR TO ANDERSON-ENDEBROCK COMPANY, INC., A CORPORATION OF CALIFORNIA.

TRAILER BRAKE.

Application filed October 25, 1921. Serial No. 510,261.

*To all whom it may concern:*

Be it known that I, PAUL T. REGAN, a citizen of the United States, residing at Oakland, in the county of Alameda, State of California, have invented a new and useful Trailer Brake, of which the following is a specification in such full and clear terms as will enable those skilled in the art to construct and use the same.

This invention relates to a trailer brake and its object is to enable the driver of the truck or other vehicle to which the trailer is connected to properly operate the brakes, both the trailer and the truck, notwithstanding the variation in distance between the trailer and truck due to the use of flexible couplings connecting the two vehicles.

It will be understood by those skilled in the art that in the operation of a trailer that it is essential to provide some form of flexible connection between the trailer and the truck on account of the large loads carried by the trailers. This necessitates the operation of the trailer brake through some sort of a flexible connection.

Another object of the invention is to enable the brakes to be operated equally on both the trailer and the truck with the aid of equalizing levers. In carrying out this invention a flexible tube is used through which flexible tube the operating cable passes; the tube being incompressible when the cable is within the same permits the use of cables for the operation of the trailer brakes by attaching the tube to a fixed point on the trailer and another fixed point on the truck.

Another object of the invention is to provide means whereby the trailer brake operating apparatus may be as easily disconnected from the truck as the trailer coupling and without interfering with the braking of the truck itself.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a plan view of a portion of a truck showing the trailer connected therewith.

Fig. 2 is an end view of one of the flexible tube connectors.

Fig. 3 is a side elevation of the connector for the flexible tube which is secured to the truck, the matching part for Fig. 2.

Fig. 4 is a side elevation of the truck and trailer showing the application of the brakes thereto, and Fig. 5 is a view of the flexible tube showing the means for connecting it to the truck and to the trailer, the connectors being shown in section.

The numeral 1 indicates the frame of the truck. It is supported in the usual way by means of the axle 2 and wheels 3 and 4. The wheels have brake drums 5 and 6 with the usual form of brakes operated by the rods 7 and 8. These brake rods are connected to a transversely extending brake bar 9. The brake bar has a link 10 connected thereto at its center, which link is in turn connected to a short equalizing lever 11 at the middle of which the brake rod 12 extending to the driver's position is connected.

One end of the lever 11 is connected to a cable 13. This cable has a hook at its end as indicated at 14, and the hook may be connected with an opening in the slide 15. The flexible tube through which the brake cable passes consists of a closely wound spiral 16. This spiral may be covered with any suitable fabric 17 to keep it clean, and it is connected to a bayonet joint coupling 18 at one end and to a rigid tube 19 at the other end. The tube 19 is connected to the frame of the trailer by means of a thread nut 20 on the trailer. The bayonet joint coupler has lugs 21 to 23 inclusive which pass through openings 24 in the flange 25 of the depending coupling 26 which is secured to the rear of the frame of the truck by means of bolts 27, 28.

The coupler 26 has a forwardly projecting flange with a ring to receive the hook 14 as indicated at 29, the hook 14 being placed in the ring 29 when the trailer is removed from the truck.

The trailer has the frame 30 supported in the usual manner from the axles 31, 32, the latter being the axle carrying the steering knuckles 33, 34 on which the wheels 35, 36 are placed. Drag links 37, 38 connect the steering pole 39 with the steering knuckles, and through the aid of the vertically movable pole 40 pivotally connected to the member 39 at 41 and pivotally connected to the rearwardly extending coupler 42 by means of the pin 43, enables the trailer to be steered by the truck.

The coupling pole 40 has a longitudinally movable portion 44 which is held in position by means of a heavy spiral spring 45 within the member 40; the object being to give the necessary flexible connection in starting the trailer.

The rear axle of the trailer is provided with the wheels 46, 47 which have brake drums 48, 49, and which are operated by the brake rods 50, 51 connected in turn to the brake equalizing bar 52. The brake equalizing bar 52 is supported by a plate 53 from a cross member 54, and a small roller 55 causes the brake cable 56 to pull at the center of the bar 52, and parallel with the proper line of movement of the rods 50, 51. It will be observed that the brake rod 12 pulls at the center of the lever 11, while the link 10 pulls at the center of the bar 9, and in turn the cable 13 which is connected to the slide 15 pulls the cable 16', which is connected to the center of the brake bar 52, thereby equalizing as nearly as is possible the pull on all four of the brake drums, and since the tube 16 is incompressible when the cable 16' passes therethrough, regarding the position of the trailer with respect to the truck within the limits of the draw bar connection, the cable 16' will operate the tralier brakes.

What I claim is as follows, but various modifications may be made in the construction shown in the drawings and above particularly described form, within the purview of my invention.

1. An apparatus of the class described comprising the combination with a truck of brakes therefor, brake operating mechanism, a brake operating and equalizing lever, flexible means on the truck to connect the trailer thereto, a trailer, brakes therefor, a cable for operating said brakes and extended to and connected with the equalizing lever on the truck, and a detachable flexible tube enclosing said cable between fixed points on the trailer and on the truck.

2. An apparatus of the class described comprising the combination with a truck of brake operating apparatus thereon, an equalizing lever to which said brake operating apparatus is connected, brakes on the truck operated by said equalizing lever, a trailer having means to connect it to the truck, brakes on the trailer, a cable for operating said brakes extending to and connected with the equalizing lever on the truck, a flexible incompressible tube through which the cable passes between fixed points on the trailer and on the truck, and means to disconnect said tube and cable from the truck at will.

3. An apparatus of the class described comprising the combination with a truck of brakes therefor, an equalizing lever for operating the truck brakes, a cable connected with said equalizing lever, a trailer flexibly connected to the truck, a brake on the trailer to which said cable is connected, a flexible tube through which the cable passes between fixed points on the trailer and the truck, and a detachable coupling for connecting the flexible tube to one of the vehicles.

In testimony whereof I have hereunto set my hand this 30th day of June, A. D. 1921.

PAUL T. REGAN.